US010032482B2

(12) United States Patent
Yoshizawa

(10) Patent No.: US 10,032,482 B2
(45) Date of Patent: Jul. 24, 2018

(54) MOVING IMAGE GENERATING APPARATUS, MOVING IMAGE GENERATING METHOD AND STORAGE MEDIUM

(71) Applicant: CASIO COMPUTER CO., LTD., Tokyo (JP)

(72) Inventor: Kenji Yoshizawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 15/078,864

(22) Filed: Mar. 23, 2016

(65) Prior Publication Data

US 2016/0343403 A1 Nov. 24, 2016

(30) Foreign Application Priority Data

May 19, 2015 (JP) ................................. 2015-102312

(51) Int. Cl.
| | | |
|---|---|---|
| G11B 27/00 | (2006.01) |
| G11B 27/031 | (2006.01) |
| G06T 1/20 | (2006.01) |
| G11B 27/10 | (2006.01) |
| H04N 5/262 | (2006.01) |
| H04N 5/77 | (2006.01) |
| H04N 5/783 | (2006.01) |
| H04N 5/907 | (2006.01) |
| H04N 9/804 | (2006.01) |

(52) U.S. Cl.
CPC .............. *G11B 27/031* (2013.01); *G06T 1/20* (2013.01); *G11B 27/105* (2013.01); *H04N 5/2621* (2013.01); *H04N 5/772* (2013.01); *H04N 5/783* (2013.01); *H04N 5/907* (2013.01); *H04N 9/8042* (2013.01)

(58) Field of Classification Search
CPC ... G11B 27/034; G11B 27/34; G11B 2220/90; G11B 27/031; G11B 2220/20
USPC .......................................................... 386/280
See application file for complete search history.

(56) References Cited

U.S. PATENT DOCUMENTS 8,451,509 B2    5/2013  Hasegawa et al.
8,538,961 B2 *  9/2013  Xu .................... G06F 17/30244
                                                          382/159
(Continued)

FOREIGN PATENT DOCUMENTS

JP      2001-94979 A      4/2001
JP      2009224006 A     10/2009

OTHER PUBLICATIONS

Japanese Patent Office; Application No. JP 2015-102312; Notification of Reasons for Rejection dated Jun. 4, 2018.

*Primary Examiner* — William C Vaughn, Jr.
*Assistant Examiner* — Daniel Tekle
(74) *Attorney, Agent, or Firm* — Fitch, Even, Tabin & Flannery LLP

(57) ABSTRACT

A CPU extracts still images from image files recorded at predetermined time intervals among still images and moving images arbitrarily recorded in a predetermined period such as one day, and generates a time-lapse moving image by taking these extracted images as frames. That is, in addition to still images, even when a moving image file is recorded at timing corresponding to a predetermined time interval, a frame at the timing corresponding to the predetermined time interval in the moving image file is extracted, and adopted as a frame of a time-lapse moving image to be generated.

18 Claims, 3 Drawing Sheets

(56) References Cited

U.S. PATENT DOCUMENTS

2003/0120495 A1* 6/2003 Watanabe ............ H04H 60/07
704/278
2009/0237743 A1 9/2009 Hasegawa et al.

* cited by examiner

MOVING IMAGE GENERATING APPARATUS, MOVING IMAGE GENERATING METHOD AND STORAGE MEDIUM

CROSS-REFERENCE TO RELATED APPLICATION

This application is based upon and claims the benefit of priority from the prior Japanese Patent Application No. 2015-102312, filed May 19, 2015, the entire contents of which are incorporated herein by reference.

BACKGROUND OF THE INVENTION

1. Field of the Invention

The present invention relates to a moving image generating apparatus, a moving image generating method, and a storage medium.

2. Description of the Related Art

Conventionally, there is a technology of generating digest still images based on images selected at predetermined time intervals from still images recorded in a predetermined period (such as one day), as described in Japanese Patent Application Laid-Open (Kokai) Publication No. 2001-094979.

SUMMARY OF THE INVENTION

In accordance with one aspect of the present invention, there is provided a moving image generating apparatus comprising: an extracting section which extracts a plurality of corresponding still images from plural types of image files containing recording time information stored in a storage section, based on a plurality of timings specified by predetermined time intervals; and a moving-image generating section which generates a moving image having frames acquired by the plurality of still images extracted by the extracting section being arranged in time-series.

In accordance with one aspect of the present invention, there is provided a moving image generating method comprising: an extracting step of extracting a plurality of corresponding still images from plural types of image files containing recording time information stored in a storage section, based on a plurality of timings specified by predetermined time intervals; and a moving-image generating step of generating a moving image having frames acquired by the plurality of still images extracted in the extracting step being arranged in time-series.

In accordance with another aspect of the present invention, there is provided a non-transitory computer-readable storage medium having stored thereon a program that is executable by a computer to actualize functions comprising: extraction processing for extracting a plurality of corresponding still images from plural types of image files containing recording time information stored in a storage section, based on a plurality of timings specified by predetermined time intervals; and moving-image generation processing for generating a moving image having frames acquired by the plurality of still images extracted in the extraction processing being arranged in time-series.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENT

An embodiment of the present invention will hereinafter be described with reference to the drawings.

A. Structure of Embodiment

Figure 1:
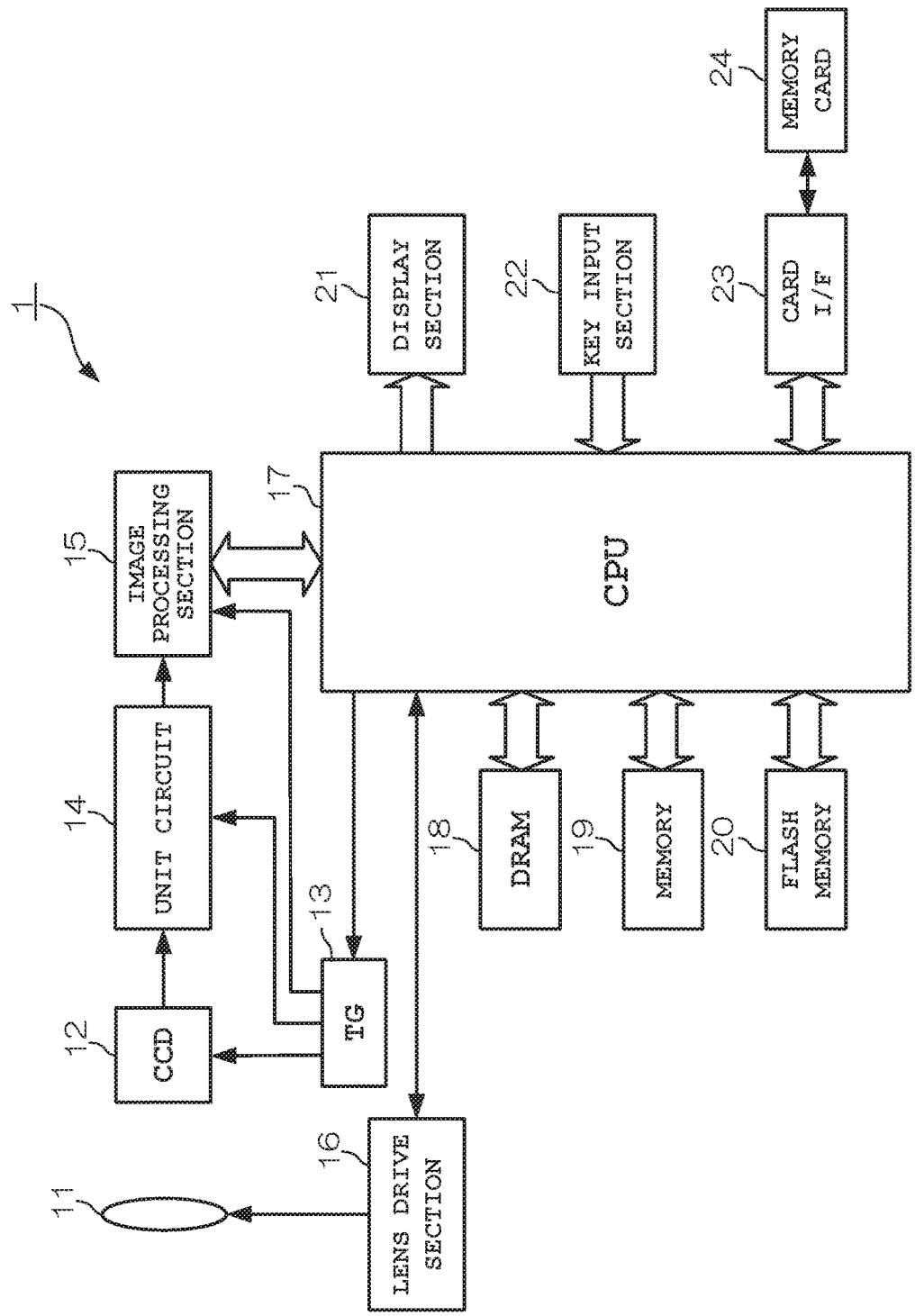
FIG. 1 is a block diagram showing the structure of a digital camera 1 according to an embodiment of the present invention.

FIG. 1 is a block diagram showing the structure of a digital camera 1 according to an embodiment of the present invention. In the drawing, the digital camera 1 includes an imaging lens 11, a CMOS (Complementary Metal Oxide Semiconductor) 12, a TG (Timing Generator) 13, a unit circuit 14, an image processing section 15, a lens drive section 16, a CPU (Central Processing Unit) 17, a DRAM (Dynamic Random Access Memory) 18, a memory 19, a flash memory 20, a display section 21, a key input section 22, a card I/F (Interface) 23, and a memory card 24.

The imaging lens 11 includes a zoom lens and a focus lens, and has a lens drive section 16 connected thereto. The lens drive section 16 drives the imaging lens 11 by following a control signal from the CPU 17, and thereby performs autofocus driving and zoom driving. The CMOS (image sensor) 12 includes an electronic shutter function (exposure and timing control of data output by the TG 13 described later, and converts the light of a photographic subject projected via the imaging lens 11 into an electric signal for output to the unit circuit 14 as an imaging signal. This CMOS 12 is driven by following a timing signal generated by the TG 13.

The unit circuit 14 is constituted by a Correlated Double Sampling (CDS) circuit that performs correlated double sampling on the imaging signal outputted from the CMOS 12 and retains the resultant signal, an Automatic Gain Control (AGC) circuit that performs automatic gain adjustment on the imaging signal after sampling, and an A/D converter that converts the analog imaging signal after automatic gain adjustment into a digital signal. This unit circuit 14 is also driven by following a timing signal generated by the TG 13. The imaging signal from the CMOS 12 is sent via the unit circuit 14 to the image processing section 15 as a digital signal.

The image processing section 15 performs image processing on image data sent from the unit circuit 14 (such as pixel interpolation processing, γ correction, luminance color-difference signal generation, white balance processing, exposure correction processing, superimposing synthesis processing, and filtering processing), compression and expansion processing on image data (for example, compression and expansion of a JPEG (Joint Photographic Experts Group) format, Motion-JPEG format, or MPEG (Moving Picture Experts Group) format), and processing such as trimming and digital zooming of captured images. This image processing section 15 is also driven by following a timing signal generated by the TG 13.

The CPU 17 is a one-chip microcomputer that controls each section of the digital camera 1. In particular, in the present embodiment, the CPU 17 extracts images captured at predetermined time intervals from still images and moving images arbitrarily recorded in a predetermined period (for example, one day), and generates a time-lapse moving image by taking these extracted images as frames.

The DRAM 18 is used as a buffer memory that temporarily stores image data acquired by the CMOS 12 and then sent to the CPU 17, and is used also as a working memory for the CPU 17. The CPU 17 performs control such that captured images stored in the DRAM 18 are subjected to the above-described processing. The memory 19 has recorded thereon a program necessary for the CPU 17 to control each section of the digital camera 1 and data necessary to control each section, and the CPU 17 performs processing by following this program. The flash memory 20 and the memory card 24 are recording media which store image data acquired by the CMOS 12 and the like.

The display section 21 includes a color liquid-crystal display device and its drive circuit. When the digital camera 1 is in an imaging standby state, the display section 21 displays images captured by the CMOS 12 as a live view image. In the playback of recorded images, the display section 21 displays recorded images read out from the flash memory 20 or the memory card 24 and expanded. In image capturing, the display section 21 sequentially displays the number of images captured up to a current point, recording duration, and the like. When image capturing is not being performed, the display section 21 displays the remaining amount of a power supply, a memory space, and a current imaging condition (setting detail). The key input section 22 includes operation keys such as a shutter button, an imaging mode setting dial, a zoom switch, a SET key, and a cross key, and outputs an operation signal in accordance with a key operation by a user to the CPU 17. The card I/F 23 has the memory card 24 removably attached thereto via a card slot of the main body of the digital camera 1.

In the present embodiment, the CPU 17 extracts still images from image files recorded at predetermined time intervals among still images and moving images arbitrarily recorded in a predetermined period (for example, one day), and generates a time-lapse moving image by taking these extracted images as frames. That is, in addition to still images, even when a moving image file is recorded at timing corresponding to a predetermined time interval, a frame at the timing corresponding to the predetermined time interval in the moving image file is extracted, and adopted as a frame of a time-lapse moving image to be generated.

As described above, in the present embodiment, still images are extracted from image files recorded at predetermined time intervals among not only still images but also moving images arbitrarily recorded in a predetermined period (for example, one day), and a time-lapse moving image is generated by the extracted images being taken as frames, as described above. Thus, it is possible to generate a moving image file having temporal continuity and allowing an easy grasp of a lapse of time.

B. Operation of Embodiment

Next, an operation of the above-described embodiment is described.

Figure 2:
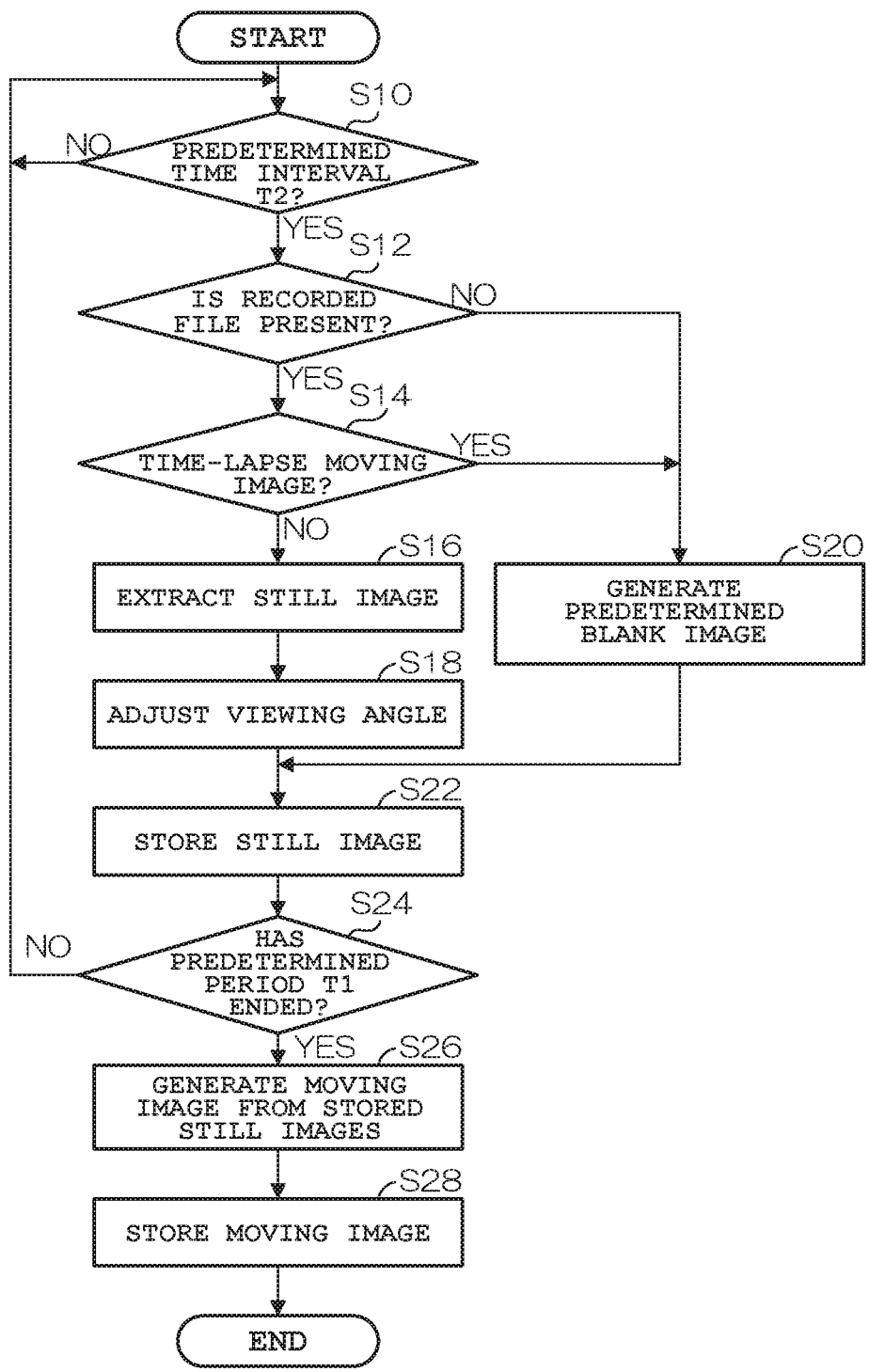
FIG. 2 is a flowchart for describing the operation of the digital camera 1 according to the present embodiment.

FIG. 2 is a flowchart for describing an operation (time-lapse moving image generation processing) of the digital camera 1 according to the present embodiment. The processing in the flowchart depicted in FIG. 2 is performed by the CPU 17 concurrently with a normal operation (such as still-image/moving-image taking and still-image/moving-image replay) of the digital camera 1 or at arbitrary timing.

First, the CPU 17 sets a predetermined period T1 (for example, one day) representing an entire period for extracting still images that constitute a time-lapse moving image and a predetermined time interval T2 (for example, five minutes, ten minutes, thirty minutes, or one hour) representing an extraction interval for extracting a still image. When settings are not particularly performed, for example, the predetermined period T1 is set as one day (twenty-four hours) and the predetermined time interval T2 is set as ten minutes, as default values.

In the following descriptions, the operation is described based on an assumption that time-lapse moving image generation processing depicted in FIG. 2 is performed concurrently with a normal operation (such as still/moving image capturing and still/moving image playback) of the digital camera 1.

When time-lapse moving image generation processing is performed, the CPU 17 first judges whether the predetermined time interval T2 has come (Step S10). When judged that the predetermined time interval T2 has not come (NO at Step S10), the CPU 17 enters a standby state. Conversely, when judged that the predetermined time interval T2 has come (YES at Step S10), the CPU 17 judges whether an image file recorded at that imaging timing is present, based on "date time original" in the image file serving as recording time information (Step S12). Here, for example, if an image file recorded at timing with a difference such as several tens of seconds or several minutes is present, that image file can be taken as an image file recorded at that time (which will be described in detail below).

Also, when the image file is a moving image file, information regarding an imaging start time, a recording time, a frame rate, and the like is recorded as recording time information in profile information of that moving image file. Accordingly, from this information, a frame imaged at the predetermined time interval is specified, and extracted as a still image.

Then, when the above-described image file is present (YES at Step S12), the CPU 17 judges whether the image file is an arbitrary time-lapse moving image already created (Step S14). When the image file is not a time-lapse moving image, that is, when the image file is a still image or moving image (NO at Step S14), the CPU 17 extracts the still image from the image file (Step S16), and adjusts the viewing angle of the extracted still image (Step S18).

On the other hand, when an image file with a time stamp corresponding to the current time is not present (NO at Step S12) or when a relevant image file is present but is a time-lapse moving image (YES at Step S14), a new time-lapse moving image is generated from this time-lapse moving image. However, it is not appropriate to use a frame of the already generated time-lapse moving image as a frame of the time-lapse moving image to be newly generated this time. Therefore, the CPU 17 generates a predetermined blank image in place of the frame of the time-lapse moving image already generated (Step S20). Note that, in place of this predetermined blank image, the CPU 17 may adopt a still image extracted at the immediately preceding timing.

Next, the CPU 17 stores the still image having the adjusted viewing angle or the blank image (Step S22). Next, the CPU 17 judges whether the predetermined period T1 has elapsed (Step S24). Then, when judged that the predetermined period T1 has not elapsed (NO at Step S24), the CPU 17 returns to Step S10, and repeatedly performs the above-described processing.

As such, at Steps S10 to S24, still images are extracted from image files of still images or moving images recorded at the predetermined time intervals T2 until the predetermined period T1 elapses. Then, when the predetermined period T1 elapses (YES at Step S24), the CPU 17 generates a time-lapse moving image by taking the stored still images as frames, and acquires it as a file by compression in a MPEG format (Step S26). Then, the CPU 17 stores the moving image file of the time-lapse moving image (Step S28).

Figure 3:
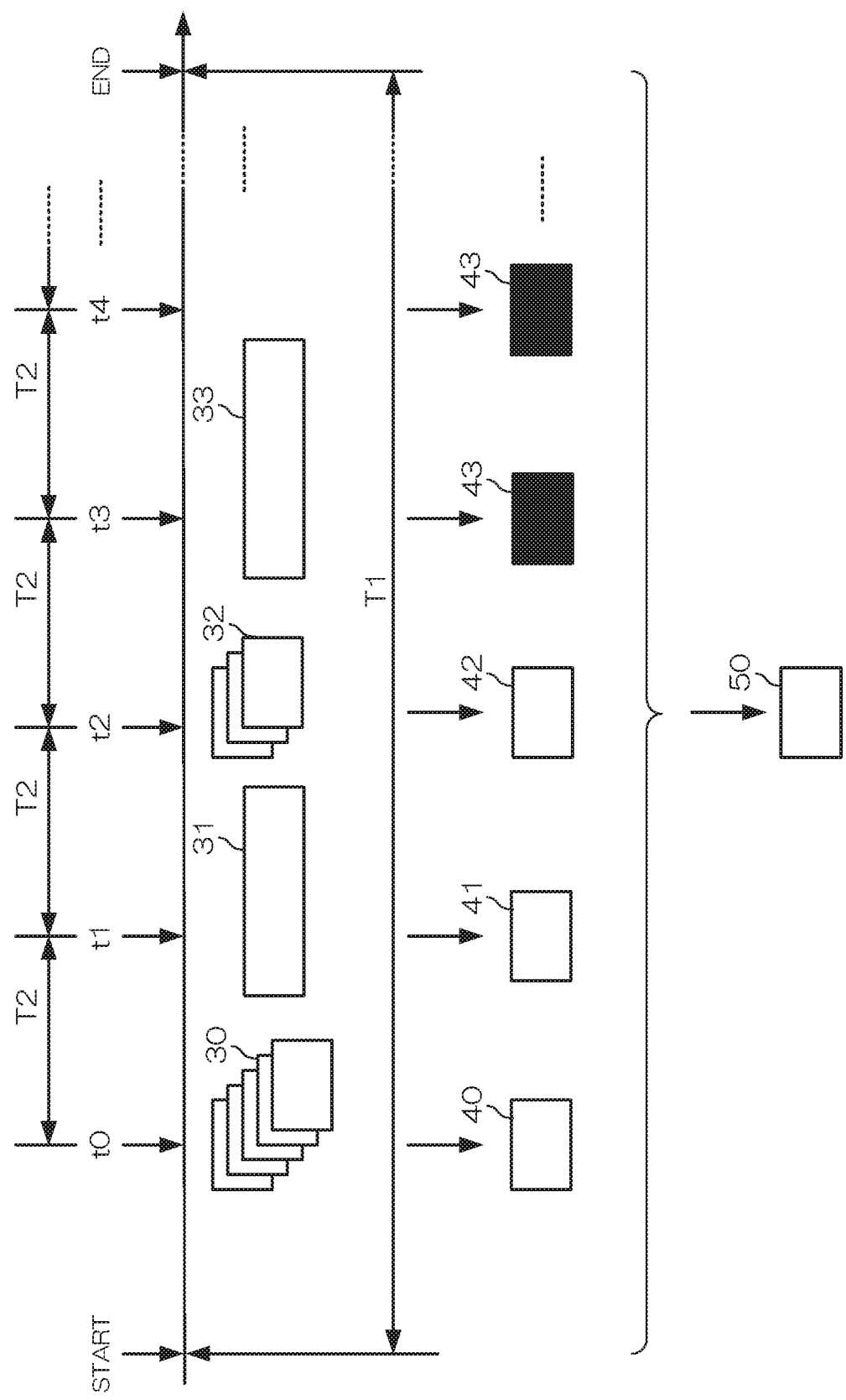
FIG. 3 is a sequence diagram for describing the operation of the digital camera 1 according to the present embodiment.

FIG. 3 is a sequence diagram for describing the operation of the digital camera 1 according to the present embodiment. As depicted in FIG. 3, still images are extracted from image files recorded at the time intervals T2 during the predetermined period T1 from "START" to "END". More specifically, a still image 40 is extracted from a still image group 30 as an image recorded at a time t0, a still image (frame) 41 is extracted from a moving image 31 as an image recorded at a time t1, and a still image 42 is extracted from a still image group 32 as an image recorded at a time t2.

In this case, when a recorded still image is not present at the time t0 to the time t2, if there is a still image or a frame of a moving image corresponding to the immediately-preceding or immediately-subsequent imaging time (shorter than the predetermined period), this still image or frame is extracted.

Specifically, in a case where still images are extracted at every T=10 minutes, that is, every ten minutes in a predetermined period from 11 a.m. to 2 p.m., if a still image or a frame of a moving image recorded at 1 p.m. does not exist and there is a still image or a frame of a moving image captured within several minutes before or after 1 p.m., this still image or frame is adopted.

However, in order to keep temporal continuity in the generated time-lapse moving image, it is desired that a still image or a frame of a moving image is present in a time width within five minutes, which is equal to or less than half of the predetermined period T.

From the time t0 to the time t2, when at least the times t1 and t2 are included in the imaging time of a same moving image file, frames captured at the times t1 and t2 are extracted as still images.

Next, since an image file at a time t3 is a time-lapse moving image 33, a predetermined blank image 43 prepared in advance (or the immediately-previous still image 42) is adopted for the generation of a time-lapse moving image to be generated this time, instead of a frame of the already generated time-lapse moving image. Furthermore, since no image file is present at a time t4, the predetermined blank image 43 (or the immediately-previous still image 42) is also adopted therefor. Then, from the stored still images 40, 41, 42 and blank images 43, a time-lapse moving image 50 is generated, coded, and compressed to create a moving image file for storage.

According to the above-described embodiment, still images are extracted at the predetermined time intervals T2 in the predetermined period T1 from image files recorded at the predetermined time intervals T2, and the plurality of extracted still images are arranged in time-series to generate a time-lapse moving image. As a result of this configuration, it is possible to generate a moving image having temporal continuity and allowing an easy grasp of a lapse of time.

Also, according to the above-described embodiment, when the above-described image file is a time-lapse moving image captured at a specific time interval, a new time-lapse moving image is generated by using predetermined still images. As a result of this configuration, it is possible to generate a more natural moving image having temporal continuity and allowing an easy grasp of a lapse of time.

Moreover, according to the above-described embodiment, when there is no image file, a predetermined still image is used to generate a time-lapse moving image. As a result of this configuration, it is possible to generate a more natural moving image having temporal continuity and allowing an easy grasp of a lapse of time.

Furthermore, according to the above-described embodiment, still images are extracted from still-image files or moving-image files as image files, and the plurality of extracted still images are arranged in time-series to generate a time-lapse moving image. As a result of this configuration, it is possible to generate a moving image having temporal continuity and allowing an easy grasp of a lapse of time.

In the above-described embodiment, the time-lapse moving image generation processing depicted in FIG. 2 is performed concurrently with a normal operation (such as still/moving image capturing and still/moving image playback) of the digital camera 1. However, the present embodiment is not limited thereto, and a configuration may be adopted in which, when the time-lapse moving image generation processing is performed at arbitrary timing, still images are extracted at the predetermined time intervals T2 from existing image files of still images or moving images started to be acquired from a time point traced back the time equivalent to the predetermined period T1 from this processing (or a range specified by the user), and a time-lapse moving image is generated from these extracted still images and acquired as a file.

While the present invention has been described with reference to the preferred embodiments, it is intended that the invention be not limited by any of the details of the description therein but includes all the embodiments which fall within the scope of the appended claims.

What is claimed is:

1. A moving image generating apparatus comprising: a processor and a memory having a program recorded thereon to be executed by the processor to control operation of an imaging section and a control section; the control section being configured to: generate plural types of image files containing recording time information by causing the imaging section to perform digital imaging processing and store the plural types of digital image files in the memory, extract a plurality of corresponding still images from the plural types of digital image files stored in the memory, based on a plurality of timings specified by predetermined time intervals, and generate a moving image having frames acquired by the extracted plurality of still images being arranged in time-series, wherein the control section: judges whether an already-generated moving image has been recorded in the memory, and when judged that an already-generated moving image has been recorded in the memory, excludes the recorded moving image from an extraction target from which still images are to be extracted and generates a moving image.

2. The moving image generating apparatus according to claim 1, wherein the control section extracts the still images from the plural types of digital image files at the predetermined time intervals in a predetermined period.

3. The moving image generating apparatus according to claim 1, wherein the control section: further judges whether an image file recorded at a time including a predetermined time interval has been stored in the memory, and generates a moving image by using a predetermined still image prepared in advance as a still image to be extracted, when judged that the image file is not present.

4. The moving image generating apparatus according to claim 1, wherein the image files include a still-image file or a moving-image file.

5. The moving image generating apparatus according to claim 4, wherein the control section:
specifies a frame corresponding to a still image to be extracted, based on information stored in the moving-image file serving as an image file.

6. A moving image generating method comprising: a processor and a memory having a program recorded thereon for being executed by the processor to perform the following steps: a generating and storing step of generating plural types of digital image files containing recording time information by causing an imaging section to perform digital imaging processing and storing the plural types of image files in the memory; an extracting step of extracting a plurality of corresponding still images from the plural types of digital image files stored in the memory, based on a plurality of timings specified by predetermined time intervals; and a moving-image generating step of generating a moving image having frames acquired by the plurality of still images extracted in the extracting step being arranged in time-series, wherein the method further comprises: a judging step of judging whether an already-generated moving image has been recorded in the memory, wherein, when an already-generated moving image is judged to have been recorded in the memory in the judging step, the moving-image generating step excludes the recorded moving image from an extraction target from which still images are to be extracted and generates a moving image.

7. The moving image generating method according to claim 6, wherein the extracting step extracts the still images from the plural types of digital image files at the predetermined time intervals in a predetermined period.

8. The moving image generating method according to claim 6, further comprising: a presence judging step of judging whether an image file recorded at a time including a predetermined time interval has been stored in the memory, wherein the moving-image generating step generates a moving image by using a predetermined still image prepared in advance as a still image to be extracted in the extracting step, when the image file is judged not to be present in the presence judging step.

9. The moving image generating method according to claim 6, wherein the digital image files include a still-image file or a moving-image file.

10. The moving image generating method according to claim 9, further comprising:
a frame specifying step of specifying a frame corresponding to a still image to be extracted, based on information stored in the moving-image file serving as an image file.

11. A non-transitory computer-readable storage medium having stored thereon a program that is executable by a computer to actualize functions comprising:
generating and storing processing for generating plural types of image files containing recording time information by causing an imaging section to perform imaging processing and storing the plural types of image files in a storage section;
extraction processing for extracting a plurality of corresponding still images from the plural types of image files stored in the storage section, based on a plurality of timings specified by predetermined time intervals;
moving-image generation processing for generating a moving image having frames acquired by the plurality of still images extracted in the extraction processing being arranged in time-series; and
judgment processing for judging whether an already-generated moving image has been recorded in the storage section,
wherein, when an already-generated moving image is judged to have been recorded in the storage section in the judgment processing, the moving-image generation processing excludes the recorded moving image from an extraction target from which still images are to be extracted and generates a moving image.

12. The non-transitory computer-readable storage medium according to claim 11, wherein the extraction processing extracts the still images from the plural types of image files at the predetermined time intervals in a predetermined period.

13. The non-transitory computer-readable storage medium according to claim 11, further comprising:
presence judgment processing for judging whether an image file recorded at a time including a predetermined time interval has been stored in the storage section,
wherein the moving-image generation processing generates a moving image by using a predetermined still image prepared in advance as a still image to be extracted in the extraction processing, when the image file is judged not to be present in the presence judgment processing.

14. The non-transitory computer-readable storage medium according to claim 11, wherein the image files include a still-image file or a moving-image file.

15. The non-transitory computer-readable storage medium according to claim 14, further comprising:
frame specifying processing for specifying a frame corresponding to a still image to be extracted, based on information stored in the moving-image file serving as an image file.

16. A moving image generating method comprising:
an extracting step of extracting a plurality of still images from plural types of image files containing recording time information stored in a storage section;
a moving-image generating step of generating a moving image having frames acquired by the plurality of still images extracted in the extracting step being arranged in time-series; and
a judging step of judging whether a moving image already generated in the moving-image generating step has been recorded in the storage section,
wherein, when the generated moving image is judged to have been recorded in the storage section in the judging step, the moving-image generating step excludes the recorded moving image from an extraction target from which still images are to be extracted for generating the moving image.

17. The moving image generating method according to claim 16, wherein the extracting step extracts a plurality of corresponding still images from the plural types of image files stored in the storage section, based on a plurality of timings specified by predetermined time intervals.

18. A non-transitory computer-readable storage medium having stored thereon a program that is executable by a computer to actualize functions comprising:
extraction processing for extracting a plurality of still images from plural types of image files containing recording time information stored in a storage section;

moving-image generation processing for generating a moving image having frames acquired by the plurality of still images extracted in the extraction processing being arranged in time-series; and judgment processing for judging whether a moving image already generated in the moving-image generating processing has been recorded in the storage section, wherein, when the generated moving image is judged to have been recorded in the storage section in the judgment processing, the moving-image generating processing excludes the recorded moving image from an extraction target from which still images are to be extracted for generating the moving image.

* * * * *